United States Patent [19]

Suzuki et al.

[11] Patent Number: 4,540,072
[45] Date of Patent: Sep. 10, 1985

[54] BRAKE HOLDER

[75] Inventors: Shoji Suzuki; Ichiro Ishiwata, both of Kanagawa, Japan

[73] Assignee: Nippon Air Brake Co., Ltd., Kobe, Japan

[21] Appl. No.: 389,027

[22] Filed: Jun. 16, 1982

[30] Foreign Application Priority Data

Jun. 27, 1981 [JP] Japan .................................. 56-99877
Jun. 27, 1981 [JP] Japan .................................. 56-99878

[51] Int. Cl.³ ............................................ B60K 41/24
[52] U.S. Cl. .................................. 192/4 A; 192/3 H; 192/13 A
[58] Field of Search ............... 192/13 A, 3 H, 4 A; 188/353; 303/89

[56] References Cited

U.S. PATENT DOCUMENTS 2,136,410 11/1938 Boldt et al. ..................... 192/13 A
2,153,749 4/1939 Freeman ......................... 192/13 A
2,190,981 2/1940 Freeman ......................... 192/13 A
4,247,154 1/1981 Shoji et al. ..................... 192/13 A Primary Examiner—George H. Krizmanich
Attorney, Agent, or Firm—McDougall, Hersh & Scott

[57] ABSTRACT

In a brake control apparatus which comprises two brake systems for supplying pressurized fluid from a brake master cylinder to brake wheel cylinders through conduit systems independent from each other, one of said two brake systems including a first brake control valve which is able to check the fluid flow towards said brake master cylinder from one of said brake wheel cylinders on detecting an inclined roadway, and is able to open and close in accordance with clutch operation, another of said two brake systems includes a second brake control valve which is able to check the fluid flow towards said brake master cylinder from another of said brake wheel cylinders to response to operation of said first brake control valve.

27 Claims, 6 Drawing Figures

BRAKE HOLDER

BACKGROUND OF THE INVENTION

1. Field of the Invention

This invention relates to a brake control apparatus for an automobile, and more particularly to a brake control apparatus suitable for starting the automobile stopped facing upwardly on an inclined roadway.

2. Description of the Prior Art

Generally when the driver or operator will start the automobile stopped by a side braking system or a hand braking system, facing upwardly on an inclined roadway, the driver treads an accelerator pedal to raise the rotational speed of the internal combustion engine to a certain extent, while actuating a clutch pedal to softly press a clutch disc to a fly wheel in a clutch system. Such a condition of the clutch system is generally called "semi-clutching condition". Next, the driver further treads the accelerator pedal to gradually start the automobile, releasing the brake of the hand braking system and maintaining the semi-clutching condition.

As above described, when the automobile stopped on the inclined road-way will be started, the hand lever of the hand braking system, the clutch pedal and the accelerator pedal should be operated almost at the same time. Such operations are very difficult for the driver inexperienced in drive of the automobile. The inexperienced driver sometimes fails to start the automobile. At such a time, the automobile moves back to collide with another automobile in some cases.

Such a brake control operation to facilitate the start of the automobile stopped on the inclined roadway is known that includes a brake control valve which is closed by a movable valve member when the automobile is facing upwardly on the inclined roadway, to check brake fluid flow from a wheel cylinder to a master cylinder, and a cam shaft interconnected to a clutch pedal, having a cam portion positioned in a brake fluid passage. The brake control valve is arranged in a brake fluid conduit between the master cylinder and the wheel cylinder. The cam portion is displaced with actuation of the clutch pedal to displace the movable valve member to open and close the valve.

When the automobile using the above described brake control valve will be stopped facing upwardly on the inclined roadway, the master cylinder is actuated to apply the brake fluid pressure to the wheel cylinder. The clutch pedal is operated to disengage the clutch disc from the fly wheel in the condition that the brake fluid pressure is maintained in the brake fluid conduit. Thus, the valve is closed to check the brake fluid flow from the wheel cylinder to the master cylinder. Although the foot of the driver is removed from the brake pedal, the brake fluid pressure is held in the conduit between the valve and the wheel cylinder. For the start of the automobile, the clutch pedal is operated to softly press the clutch disc to the fly wheel, namely to put the clutch system into the semi-clutching condition. The valve is opened to release the brake fluid pressure held in the conduit. The accelerator pedal is treaded simultaneously with the clutch operation, to raise gradually the speed of the engine. The automobile is started without operation of the hand braking system. Thus, the automobile can be easily started even by the inexperienced driver.

However, the above brake control apparatus is arranged only in one of plural brake fluid pressure systems or conduits connecting the master cylinder and the wheel cylinders of the wheels. Accordingly, while the automobile is stopped on the inclined roadway, the wheel cylinders in the other brake fluid pressure systems are released from brake fluid pressure. In some cases, or on a steeply inclined roadway, the braking force in the one brake fluid pressure system is insufficient to keep the automobile stopping on the inclined roadway. The automobile moves back. An accident might occur.

In most of recent automobiles, one brake fluid pressure conduit is connected to front wheel cylinders, and another brake fluid pressure conduit is connected to rear wheel cylinders. Or one brake fluid pressure conduit is connected to a right front wheel cylinder and a left rear wheel cylinder, and another brake fluid pressure conduit is connected to a left front wheel cylinder and a right rear wheel cylinder. The former connections are called "front-rear connecting type", and the latter connections are called "X connecting type". A braking force applied by the one brake fluid pressure conduit is half as large as a braking force applied by both of the brake fluid pressure conduits.

In order to solve the above-described problem, this applicant proposed such a brake control apparatus that two brake control valves are arranged in the two brake fluid pressure conduits, respectively, and two balls as movable valve members are displaced by cam portions of a common cam shaft interconnected to a clutch pedal.

The problem of the insufficient braking force was solved by the above-described apparatus. However, a driving force of the cam shaft is considerably large for displacing the two balls. A fluid pressure is applied to the balls seated on the valve seats. A large treading force is required for actuating the clutch pedal. The clutch pedal is heavy. The clutch pedal is hard to be operated. In the start of the automobile, the release of the brake fluid pressure is apt to be late. The automobile does not smoothly start.

SUMMARY OF THE INVENTION

Accordingly it is an object of this invention to provide a brake control apparatus for an automobile by which the automobile stopped facing upwardly on an inclined roadway can be easily started with a small operating force.

Another object of this invention is to provide a brake control apparatus for an automobile by which the automobile can be stopped facing upwardly on an inclined roadway by a sufficient braking force.

A further object of this invention is to provide a brake control apparatus in which, after holding a brake fluid pressure in a wheel cylinder, a braking force can be compensated.

A still further object of this invention is to provide a brake control apparatus in which air purging operation can be easily performed.

In accordance with an aspect of this invention, a brake control apparatus for an automobile having a brake fluid pressure generating source actuatable by a driver, at least two wheels with wheel cylinder, and at least two brake fluid pressure systems, one of said systems being connected between said brake fluid generating source and one of said wheel cylinders of the wheels, and another of said systems being connected between said brake fluid generating source and another of said wheel cylinders of the wheels; said brake control apparatus, in one of said brake fluid pressure systems, includes: (A) a first main body having a first bore, a first chamber, a first inlet communicating with said first bore, and a first outlet communicating with said first chamber, said first inlet being connected to said brake fluid pressure generating source, said first outlet being connected to one of said wheel cylinders, and said first bore, first chamber, first inlet and first outlet defining a brake fluid passage between said brake fluid pressure generating source and said one of the wheel cylinders; (B) a movable valve member arranged in said first chamber, and moved by its weight when the automobile is facing upwardly on an inclined roadway.: (C) valve means arranged in said first bore, and engageable with said movable valve member to check brake fluid flow between said brake fluid pressure generating source and said one of the wheel cylinders; and (D) displacing means for displacing said movable valve member in response to stop operation of said automobile for opening and closing said valve means when said automobile is facing upwardly on said inclined roadway; and said brake control apparatus, in another of said brake fluid pressure systems, includes; (E) a second main body having a second bore, a second inlet connected to said brake fluid generating source, and a second outlet connected the other of said wheel cylinders; (F) a valve control piston slideably fitted to said second bore to form second and third chambers at both ends in said second main body, said second chamber communicating with said first chamber of said first main body, and said third chamber communicating with said second outlet; (G) second valve means arranged in a brake fluid passage between said second inlet and outlet, and engageable with said valve control piston to block brake fluid flow towards said second inlet from said second outlet, said valve control piston being moved to said second valve means when an urging force to said valve control position from said second chamber becomes higher than another urging force to said valve control piston from said third chamber and to be engaged with said second valve means.

The foregoing and other objects, features, and advantages of the present invention will be more readily understood upon consideration of the following detailed description of the preferred embodiments of the invention, taken in conjunction with the accompanying drawings.

DETAILED DESCRIPTION OF THE PREFERRED EMBODIMENTS

Figure 1:
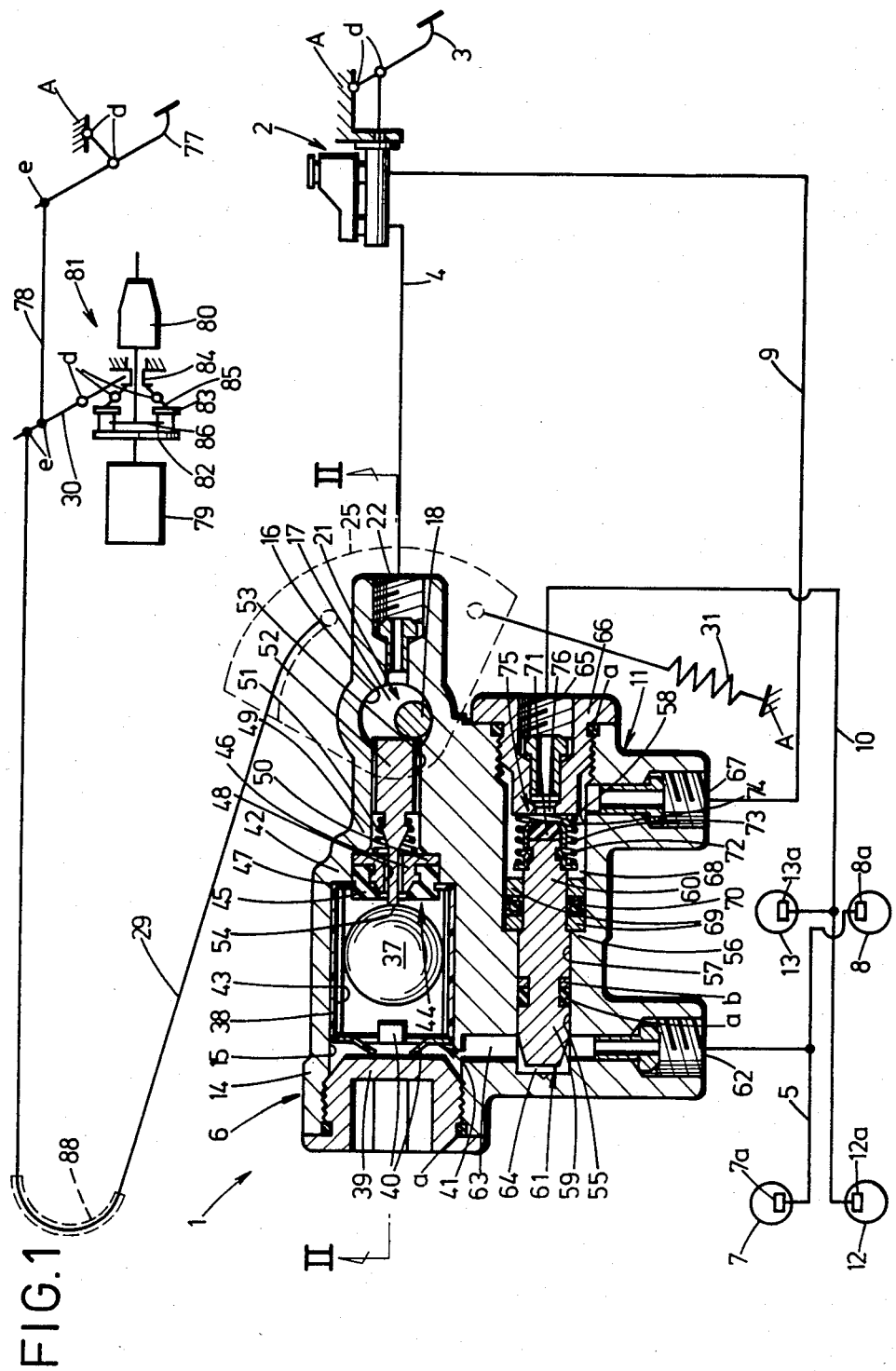
FIG. 1 is a cross-sectional view of a brake control apparatus according to a first embodiment of this invention.
Figure 2:
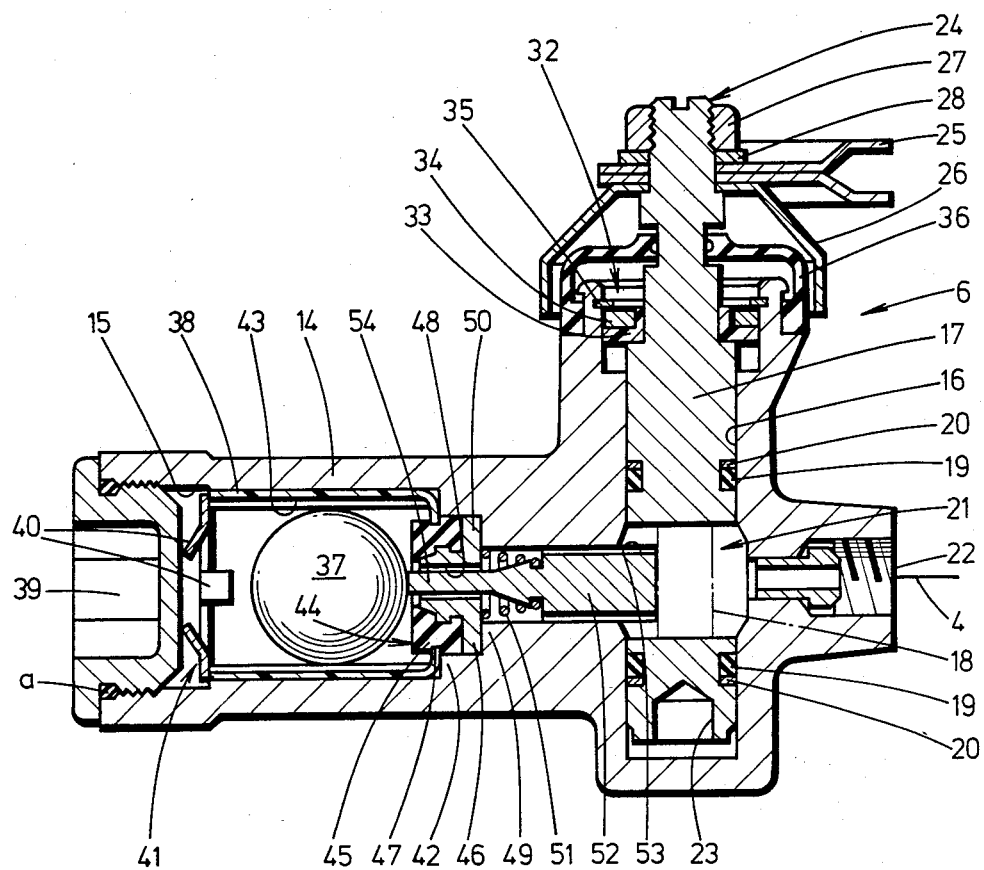
FIG. 2 is a cross-sectional view taken along the line II—II of FIG. 1.

Referring to FIG. 1 and FIG. 2, a brake control apparatus according to a first embodiment of this invention is generally indicated by a reference numeral 1. In the brake control apparatus 1, a brake tandem master cylinder 2 having two independent fluid pressure generating chambers (not shown) is supported on a part of a chassis A, and it is actuated by a brake pedal 3 which is pivoted to the chassis A. In the drawings, reference letters d designate pivotal points. One of the two fluid pressure generating chambers of the tandem master cylinder 2 is connected through a conduit 4, a first brake control valve 6, and a conduit 5 to wheel cylinders 7a and 8a of a right front wheel 7 and a left rear wheel.

In the drawings, the forward direction of the automobile is leftward. Another of the two fluid pressure generating chambers of the tandem master cylinder 2 is connected through a conduit 9, a second brake control valve 11, and a conduit 10 to wheel cylinders 12a and 13a of a left front wheel 12 and a right rear wheel 13. The first and second brake control valves 6 and 11 are formed integrally with each other.

Particularly referring to FIG. 2, in a main body 14 of the first brake control valve 6, a stepped cylindrical bore 15 is made in parallel with the direction of the movement of automobile which is equipped with the brake control apparatus 1. Another stepped cylindrical bore 16 is so made in the main body 14 as to communicate vertically with the stepped cylindrical bore 15.

A cam shaft 17 as a control shaft is rotatably inserted into the other stepped cylindrical bore 16.

The cam shaft 17 is provided with a cam portion 18 reduced in diameter and eccentric with respect to its axis. The cam portion 18 is facing to the right opening of the stepped cylindrical bore 15. At both sides of the cam portion 18, the cam shaft 17 is sealed by seal rings 19 which are supported by backup rings 20. The sealed portions of the cam shaft 17 are equal to each other in diameter. A cam chamber 21 communicating with the stepped cylindrical bore 15 is formed by the circumferential surface of the cam portion 18 and the inner wall surface of the stepped cylindrical bore 16 between the sealed portions of the cam shaft 17. The cam chamber 21 is connected through an inlet 22 to the conduit 4.

A recess 23 is formed in the lower end of the cam shaft 17, so that a volume of an air space sealed by the seal ring 19 is enlarged between the cam shaft 17 and the closed end of the stepped cylindrical bore 16. A diameter-reduced upper end portion 24 of the cam shaft 17 projects through a central hole of a slide device 32 to the external of the main body 14. A generally triangular drive member 25 and a water-protecting skirt 26 are fixed to the top end portion 24 of the cam shaft 17 by nut 27 and washer 28.

In FIG. 1, the drive member 25 is diagramatically shown. A wire 29, which is guided by a guide member 88, is connected to one end portion of the drive member 25. Another end of the wire 29 is connected to a clutch operating arm 30. In the drawings, connecting points of wires and other parts are designated by reference letters e. Another end portion of the drive member 25 is connected to one end of a release spring 31. Another end of the release spring 31 is connected to the chassis A. The drive member 25 and the cam shaft 17 are rotated by the spring action of the release spring 31 and against the release spring 31 in responce to swing motion of the clutch operating lever 30.

The cam shaft 17 is prevented from falling out from the bore 16, by the slide device 32, and further rotatably guided by the latter. It consists of a low frictional slide ring 33 of synthetic resin, a backup ring 34 and a stopper ring 35. A water-proof and dust-proof boot 36 is fixed to the opening end of the bore 16.

A ball guide 38 is fitted into the larger bore section of the stepped cylindrical bore 15. A cover 39 is screwed to the opening end of the stepped cylindrical bore 15. A spring washer 41 with elastic projections 40 is arranged between the cover 39 and the end surface of the ball guide 38. The ball guide 38 is pressed to an inner stepped portion 42 of the main body 14 by the spring washer 41. Grooves 43 are axially formed in the inner surface of the ball guide 38. A ball valve member 37 is rollably received by the ball guide 38. A valve seat assembly 44 is tightly fitted to the opening of the ball guide 38 and the middle bore section of the stepped cylindrical bore 15. The ball valve member 37 can seat onto the valve seat assembly 44. In the drawings, reference letters a and b designate seal rings and backup rings for them, respectively.

The valve seat assembly 44 consists of a seat member 45 of rubber, and a support member 46 for supporting the seat member 45. A bottom wall of the ball guide 38 is fitted into an annular groove 47 of the outer surface of the seat member 45. Sealing between the inner wall of the middle section of the stepped cylindrical bore 15, and the valve seat assembly 44 is effected by an annular projection (not shown due to squash) of the seat member 45.

A plunger 52 is slidably fitted into the smaller section of the stepped cylindrical bore 15. A top end portion 54 of the plunger 52, which is reduced in diameter, is inserted through a central opening 48 of the valve seat assembly 44, to contact with the ball valve member 37.

Axial grooves 53 are made in the circumferential surface of the larger portion of the plunger 52, through which a brake fluid can flow. A spring 51, whose spring force is relatively small, is arranged between a flange portion 50 of the valve seat support member 47 fitted to the middle bore section and the larger portion of the plunger 52 to urge the plunger 52 rightwards (FIG. 1 and FIG. 2), so that the right end of the plunger 52 always contacts with the cam surface of the cam portion 18 of the cam shaft 17.

Next, the second brake control valve 11 will be described particularly with reference to FIG. 1.

A main body of the second brake control valve 11 is formed integrally with the main body 14 of the first brake control valve 6. A stepped cylindrical bore 55 is made in parallel with the first-mentioned stepped cylindrical bore 15 in the common main body 14. A valve control piston 61 is slidably inserted into the stepped cylindrical bore 55. A seal ring 70 sandwiched between support rings 69 are fitted to a small-diameter portion 60 of the valve control piston 61. And the seal rings 70 and support rings 69 are slidably fitted into a larger section 58 of the stepped cylindrical bore 55. A large-diameter portion 59 of the valve control piston 61 are slidably fitted into a smaller section 57 of the stepped cylindrical bore 55. Two fluid pressure chambers 64 and 68 are formed at both sides of the valve control piston 61 in the stepped cylindrical bore 55. The first 64 of the fluid pressure chambers 64 and 68 communicates with an outlet 62 which is connected to the conduit 5, and it communicates through a path 63 with the larger section of the first-mentioned stepped cylindrical bore 15. A plug 66 is screwed to the opening end of the stepped cylindrical bore 55. An outlet 65 is made in the plug 66, and it is connected to the conduit 10. The second 68 of the fluid pressure chambers communicates with an inlet 67 and the outlet 65 in the shown condition. The inlet 67 is connected to the conduit 9.

A valve member 71 of rubber is fixed to the top end of the valve control piston 61 by a spring receiver 72. A spring 73, whose spring force is relatively small, is arranged between the spring receiver 72 and the plug 66, to urge the valve control piston 61 leftwards in FIG. 1.

An inner end surface 74 of the plug 66 functions as a valve seat for the valve member 71. The valve seat 74 and the valve member 71 constitute a valve 75 to cut off the communication between the conduit 10 and the second fluid pressure chamber 68. A reduced path 76 is made in the outlet 65 of the plug 66.

In FIG. 1, a clutch pedal 77 is supported on the chassis A. A clutch wire 78 is connected to the clutch pedal 77 and the clutch operating arm 30. A clutch apparatus 81 which is diagrammatically shown, is arranged between an engine 79 and a transmission mechanism 80. The clutch apparatus 81 includes the clutch operating arm 30, a fly wheel 82 rotating with the engine 79, a pressure plate 83, a block 84 which is moved in the axial direction by the clutch operating arm 30, a diaphragm spring 85 arranged between the plate 83 and the block 84, and a clutch disc 86 which is arranged between the wheel 82 and the plate 83, and frictionally engageable with them. The construction of the clutch apparatus 81 is well known. Accordingly, the detailed description will be omitted.

Next, there will be described operations of the above-described brake contrtol apparatus 1.

It is now assumed that the driver runs the automobile at a suitable speed without treading the brake pedal 3 and the clutch pedal 77. The clutch disc 86 engages frictionally with the fly wheel 82 and pressure plate 83 by full action of the diaphragm spring 85. Thus, the clutch apparatus 81 is in the so-called "clutch connecting condition". Accordingly, the cam shaft 17 is urged to the shown position by the release spring 31. The plunger 52 is put at the left position by the cam portion 18. The top end portion 54 of the plunger 52 is projected through the central hole 48 of the valve seat assembly 44 into the interior of the ball guide 38. When the automobile runs facing upwardly on an inclined roadway, the ball valve member 37 is urged towards the valve seat assembly 44 by its weight. However, since the ball valve member 37 is pushed by the top end portion 54 of the plunger 52, it cannot seat onto the valve set assembly 44. Since the brake pedal 3 is not treaded, no fluid pressure is generated in the conduits 4, 5, 9 and 10. The valve control piston 61 receives no fluid pressure from both of the fluid pressure chambers 64 an 68. Accordingly, the valve 75 is put in the opened position by the valve spring 73.

When the automobile should be brought to a stop facing upwardly on an inclined roadway, for example, near a railroad crossing, the driver treads the brake pedal 3 to brake the automobile. The pressure fluid from the one fluid pressure generating chamber of the master cylinder 2 is supplied through the conduit 4, the cam chamber 21, the grooves 53 of the plunger 52, the central hole 48 of the valve seat assembly 44, the ball guide 38, the path 63, the first fluid pressure chamber 64 and the conduit 5 to the wheel cylinders of the wheels 7 and 8, while the pressure fluid from the other fluid pressure generating chamber of the master cylinder 2 is supplied through the conduit 9, the inlet 67, the second fluid pressure chamber 68, the outlet 65 and the conduit 10 to the wheel cylinders of the wheels 12 and 13. The fluid pressures of the fluid pressure generating chambers of the master cylinder 2 are assumed to be substantially equal to each other.

Since the pressure receiving area of the left end of the valve control piston 61 is larger than that of the right end of the valve control piston 61, the rightward force to the valve control piston 61 from the first fluid pressure chamber 64 is larger then the leftward force to the valve control piston 61 from the second fluid pressure chamber 68. However, a further leftward force is applied to the valve control piston 61 from the rings 69 sandwitching the seal ring 70, since one of the rings 69 is engaged with the stepped portion of the valve control piston 61, and the other of the rings 69 receives the fluid pressure of the second fluid pressure chamber 68. Accordingly the valve control piston 61 is not moved from the position shown in FIG. 1 and FIG. 2.

When the running speed of the automobile becomes sufficiently low, the driver treads deeply the clutch pedal 77 while treading the brake pedal 3. The clutch pedal 77 is rotated round the point d to pull the clutch operating arm 30 through the wire 78. The clutch operating arm 30 is clockwisely rotated round the point d. In the clutch apparatus 81, the block 84 is moved leftwards to bend the diaphragm spring 85 round the point d. The pressure plate 83 is kept away from the fly wheel 82. The frictional engagement of the clutch disc 86 with the pressure plate 83 and flywheel 82 is perfectly released. Thus, the "clutch disconnecting condition" is obtained.

At the same time, the drive plate 25 is counter clockwisely rotated round the axis of the cam shaft 17 through the wire 29 in response to the rotation of the clutch operating arm 30, against spring action of the release spring 31.

Thus, the cam shaft 17 fixed to the drive plate 25 is rotated in the counter-clockwise direction (FIG. 1) round its axis. The plunger 52 is moved rightwards by spring action of the spring 51 with the counterclockwise rotation of the cam portion 18 of the cam shaft 17, since the right end of the plunger 52 contacts with the cam surface of the cam portion 18. The ball valve member 37 rolls to contact with the valve seat 45, with the rightward movement of the plunger 52, when the top end portion of the plunger 52 is withdrawn into the central hole 48 of the valve seat assembly 44. Thus, the master cylinder side conduit 4 is separated from the wheel cylinder side conduit 5. The communication between the master cylinder 2 and the wheel cylinders 7a and 8a of the wheels 7 and 8 is cut off by the engagement of the ball valve member 37 with the valve seat 45.

After the automobile stops, the brake pedal 3 is released from the foot of the driver. The brake fluid in the master cylinder side conduit 4 is released from pressure. However, the fluid pressure is held in the wheel cylinder side conduit 5.

On the other hand, in the second brake control valve 11, the pressure of the second fluid pressure chamber 68 decreases with the pressure of the conduit 9. The pressure when the first brake control valve 6 is closed, is maintained in the first fluid pressure chamber 64. When the sum of the leftward pressures to the valve control piston 61 and the rings 69 from the second fluid pressure chamber 68 becomes smaller than the rightward pressrue to the valve control piston 61 from the first fluid pressure chamber 64, the valve control piston 61 is moved rightwards to close the valve 75, where the spring force of the valve spring 73 and the slide resistance of the valve control piston 61 are neglected.

The pressure of the conduit 10 somewhat decreases, before the valve 75 is closed. However, since the conduit 10 is connected through the reduced path 76 to the second fluid pressure chamber 68, the pressure of the conduit 10 does not extremely decrease due to the reducing effect. Accordingly, some fluid pressure is maintained in the conduit 10.

As above described, the fluid pressure when the first brake control valve 6 is closed, is maintained in the wheel cylinders 7a and 8a of the wheels 7 and 8, and the fluid pressure which is somewhat lower than the maintained fluid pressure of the wheel cylinders 7a and 8a, is maintained in the wheel cylinders 12a and 13a of the wheels 12 and 13. A total braking force becomes somewhat lower than the total braking force when the automobile has been stopped on the inclined roadway. However, it is sufficient to keep the automobile stopping on the inclined roadway. Thus, without operation of a side brake system, the automobile is maintained in the stop condition only by treading the clutch pedal 77.

To start the automobile, the driver shifts the gears and gradually release the clutch pedal 77 from treading, while treading an accelerator pedal (not shown) to increase the rotational speed of the engine 79. The clutch operating arm 30 is rotated in the counter-clockwise direction round the point d. The clutch disc 86 is softly engaged with the flywheel 82 and the pressure plate 83 by a part of the spring force of the diaphragm spring 85. Thus, the so-called "semi-clutching condition" is obtained.

In the first brake control valve 6, the drive plate 25 is rotated in the clockwise direction (FIG. 1) by spring action of the release spring 31. Accordingly, the cam shaft 17 is rotated in the clockwise direction through the drive plate 25. The cam portion 18 is rotated back to the original position shown in FIG. 1. The plunger 52 contacting with the cam surface of the cam portion 18 is moved leftwards against the spring 51 to separate the ball valve member 37 from the valve seat 45. Accordingly, the brake fluid in the wheel cylinder side conduit 5 is released from pressure. Thus, the brake fluid is permitted to flow back to the master cylinder 2. In the second brake control valve 11, the fluid pressure of the first fluid pressure chamber 64 decreases with that of the conduit 5. The rightward and leftward forces to the valve control piston 61 from the first and second fluid pressure chambers 64 and 68 balance. The valve control piston 61 is moved back to the original position shown in FIG. 1 by spring action of the spring 73. Thus, the valve 75 is opened. The brake fluid conduit in the wheel cylinder side conduit 10 is released from pressure. The brake fluid is permitted to flow back to the master cylinder 2.

A drive force is transmitted through the clutch apparatus 81 to the drive wheels. The pressure of the wheel cylinders 7a, 8a, 12a and 13a gradually decreases, and so the braking forces to the wheels gradually decrease. At last, the automobile starts to run on the incined roadway. After the start, the clutch pedal 77 is perfectly released to obtain the full clutching condition. The automobile is in the normal running condition.

Figure 3:
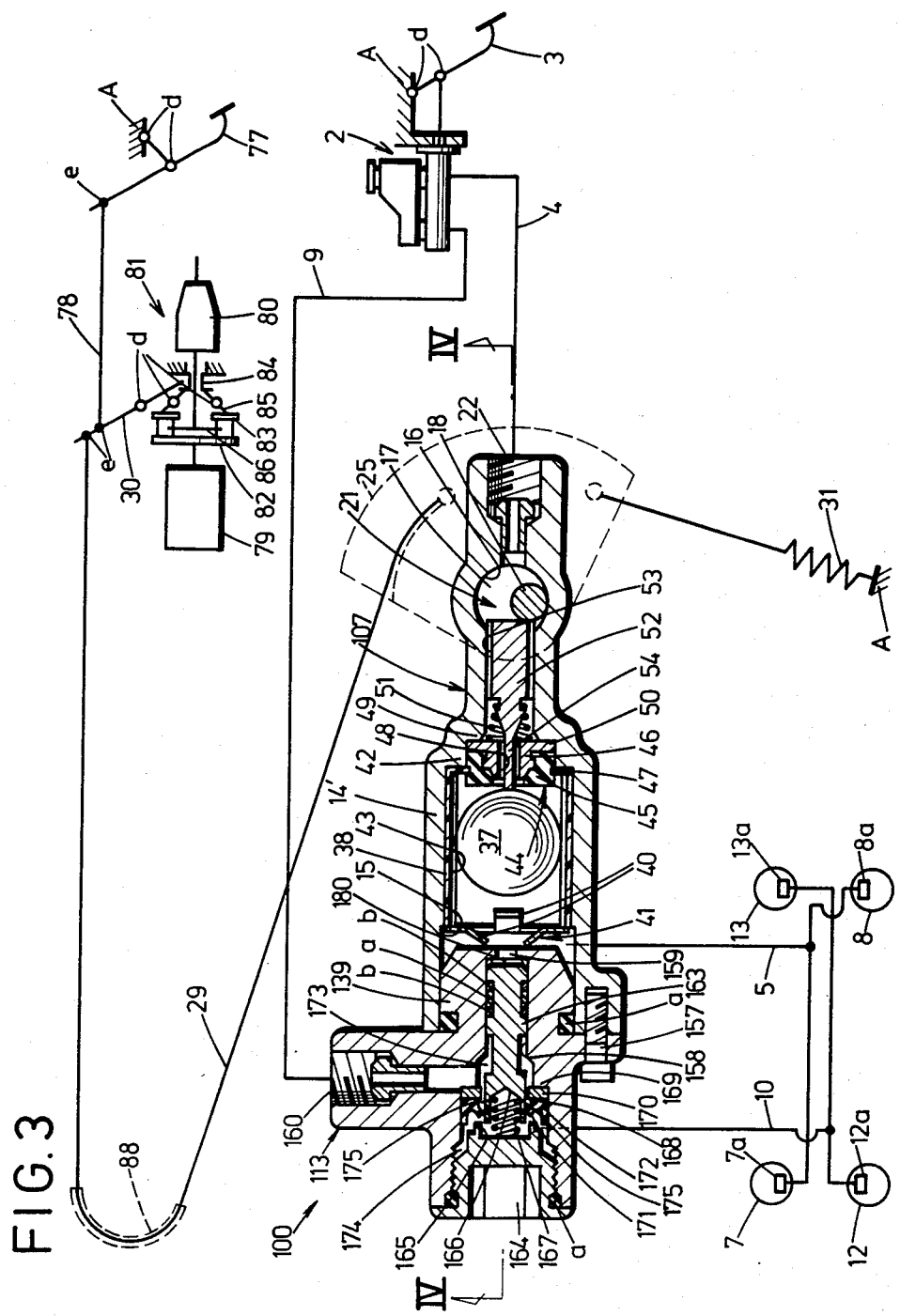
FIG. 3 is a cross-sectional view of a brake control apparatus according to a second embodiment of this invention.
Figure 4:
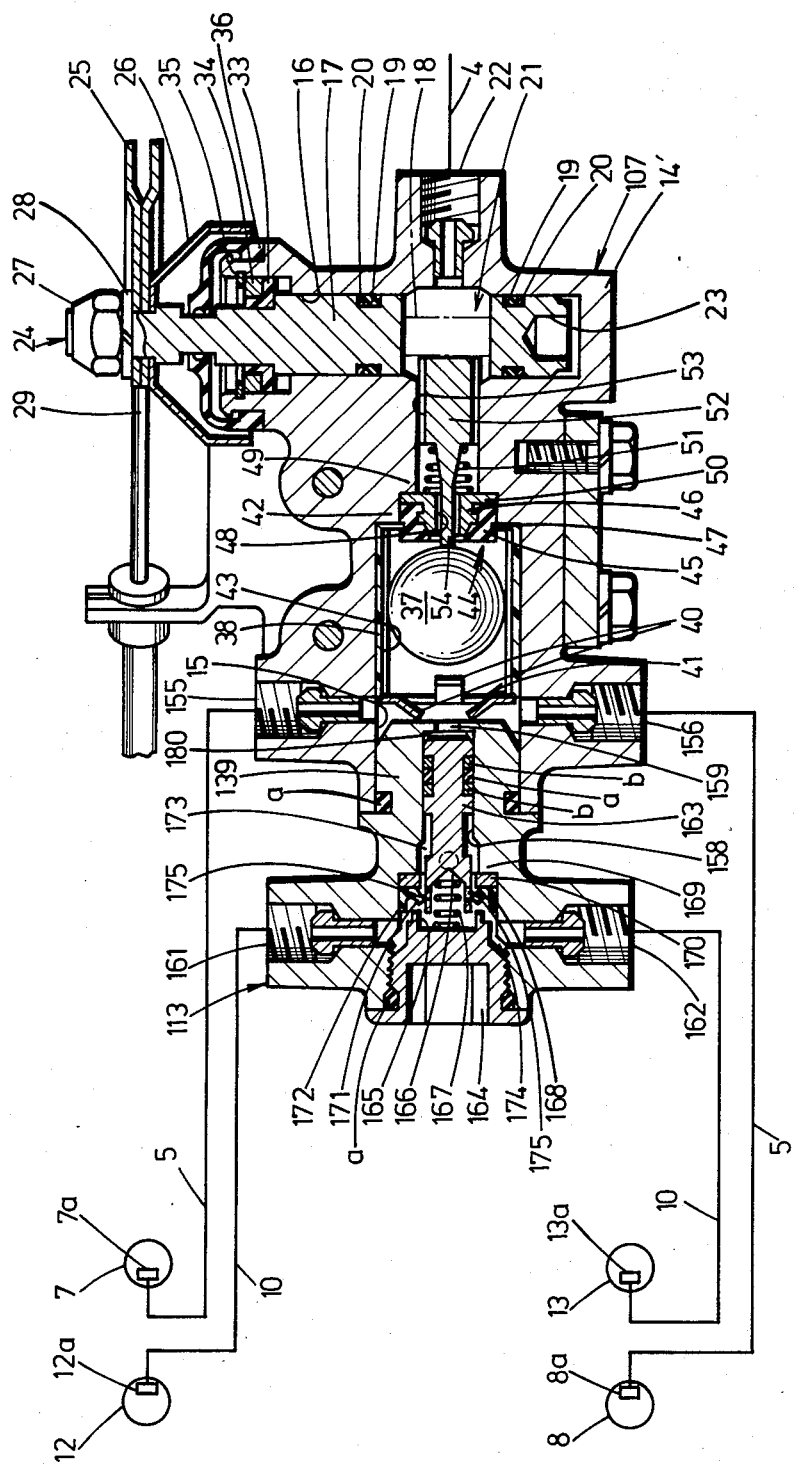
FIG. 4 is a cross-sectional view taken along the line IV—IV of FIG. 3.

Next, there will the described a second embodiment of this invention with reference to FIG. 3 and FIG. 4. Parts in FIG. 3 and FIG. 4 which correspond to those in FIG. 1 and FIG. 2, are denoted by the same reference numerals, the detailed description of which will be omitted.

This embodiment is different from the first embodiment in construction of a second brake control valve. In FIG. 3, a brake control apparatus of this embodiment is generally denoted by a reference numeral 100. Although the main body of the second brake control valve 11 is integrally formed with the main body 14 of the first brake control valve 6 in the first embodiment, a main body 139 of a second brake control valve 113 according to this embodiment is formed separately from a main body 14' of a first brake control valve 107. The main body 139 is fitted into the stepped cylindrical bore 15 of the main body 14', and it is fixed to the main body 14' by bolts 157. A stepped cylindrical bore 158 is made in the main body 139, in alignment with the stepped cylindrical bore 15 of the main body 14' of the first brake control valve 107. The former communicates through a hole 159 with the latter. A valve control piston 163 is slidably fitted into the small section of the stepped cylindrical bore 158. A left opening end of the stepped cylindrical bore 158 is covered by a cover 164. Two outlets 155 and 156 are made in the main body 14' of the first brake control valve 107, and they communicate with the interior of the ball guide 38. The conduits 5 are connected to the outlets 155 and 156, respectively. Similaly, two outlets 161 and 162 are made in the main body 139 of the second brake control valve 113, and they communicate with the large section of the stepped cylindrical bore 158. The conduits 10 are connected to the outlets 161 and 162, respectively. Further, an inlet 160 is made in the main body 139, and it communicates with the middle section of the stepped cylindrical bore 158. The conduit 9 is connected to the inlet 160.

A spring 167, whose spring force is relatively small, is arranged between an internal recess 165 of the cover 164 and a recess 166 of the left end portion of the valve control piston 163, to urge the valve control piston 163 rightwards. The left end portion of the valve control piston 163 is sealed against the large section of the stepped cylindrical bore 158 by a lip-seal type seal member 168 which faces to an annular projection forming the recess 165 of the cover 164. An inner lip portion 171 of the seal member 168 is elastically pressed to the cylindrical left end portion of the valve control piston 163, and an outer lip portion 172 of the seal member 168 is elastically pressed to the wall of the large section of the stepped cylindrical bore 158. The seal member 168 is supported through a backup ring 170 by an inner step portion 169 of the main body 139.

Small openings 175 are made in the cylindrical left end portion of the valve control piston 163. In the normal condition, the small openings 175 are positioned at the right side of the inner lip portion 171 of the seal member 168.

With the above-described arrangements, a first fluid pressure chamber 173, a second fluid pressure chamber 174 and a third fluid pressure chamber 180 are formed around the middle portion of the valve control piston 163, between the cover 164 and the left end portion of the valve control piston 163, and between the right end portion of the valve control piston 163 and the end wall of the main body 139, respectively. The first fluid pressure chamber 173 communicates through the inlet 160 with the master cylinder side conduit 9. The second fluid pressure chamber 174 commmuncicates through the outlets 161 and 162 with the wheel cylinder side conduits 10. The third fluid pressure chamber 180 communicates through the hole 159 with the interior of the ball guide 38.

Next, there will be described operation of the above-described brake control apparatus according to the second embodiment.

When the driver treads the brake pedal 3 to brake the automobile running on the inclined roadway, the brake fluid from the master cylinder 2 is supplied through the inlet 22, the cam chamber 21, the interior of the ball guide 38 and the outlets 155 and 156, to the wheel cylinders 7a and 8a of the wheels in the first brake fluid pressure system including the first brake control valve 107, and further it is supplied through the inlet 160, the first fluid pressure chamber 173, the second fluid pressure chamber 174 and the outlets 161 and 162, to the wheel cylinders 12a and 13a of the wheels 12 and 13 in the second brake fluid pressure system including the second brake control valve 113. The brake fluid from the first fluid pressure chamber 174 flows through the gap between the left end portion of the valve control piston 163 and the backup ring 170, and the small openings 175 made in the left end portion of the valve control piston 163, into the second fluid pressure chamber 174. Or it flows through the gap between the left end portion of the valve control piston 163 and the backup ring 170, and by deforming the inner lip portion 171 of the seal member 168, into the second fluid pressure chamber 174. The fluid pressure of the interior of the ball guide 38 is applied through the hole 159 to the third fluid pressure chamber 180 to urge the valve control piston 163 leftwards. The fluid pressure of the second fluid pressure chamber 174 urges the valve control piston 163 rightwards. The leftward and rightward forces to the valve control piston 163 balance. Accordingly, the valve control piston 163 does not move, and it is maintained at the shown position where the small openings 175 are positioned at the right side of the inner lip portion 171 of the seal member 168.

Next, when the clutch pedal 77 is trodden, the ball valve member 37 comes to seat on the valve seat 45 in the same manner as in the first embodiment. The brake fluid pressure is kept in the interior of the ball guide 38. And the brake pedal 3 is released from treading. The fluid pressure decreases in the first fluid pressure chamber 173, and it more slowly decreases in the second fluid pressure chamber 174 due to the throttling effect of the small openings 175 than in the first fluid pressure chamber 173. When the rightward force to the valve control piston 163 from the second fluid pressure chamber 174 becomes smaller than the leftward force to the valve control piston 163 from the third fluid pressure chamber 180, the valve control piston 163 moves leftwards, so that the small openings 175 are positioned at the left side of the inner lip portion 171 of the seal member 168. Now, the brake fluid cannot flow from the second fluid pressure chamber 174 towards the first fluid pressure chamber 173. Accordingly, a fluid pressure, although it is somewhat lower than the fluid pressure kept in the wheel cylinders 7a and 8a of the wheels 7 and 8, is kept in the wheel cylinders 12a and 13a of the wheels 12 and 13.

When the inclination of the roadway becomes more steep immediately before the automobile stops, the braking force obtained by the kept fluid pressure might become so insufficient that the automobile moves back. In such a case, the driver again treads the brake pedal 3. When the master cylinder side fluid pressure becomes higher than the wheel cylinder side fluid pressure, the inner lip portion 171 of the seal member 168 is so deformed that brake fluid is supplied from the first fluid pressure chamber 173 into the second fluid pressure chamber 174. At the same time, the ball valve member 37 is separated from the valve seat 45 due to some difference between the master cylinder side fluid pressure and the wheel cylinder side fluid pressure so that brake fluid is supplied from the cam chamber 23 side into the interior of the ball guide 38. Thus, a higher fluid pressure is applied to the wheel cylinders 7a, 8a, 12a and 13a of the wheels 7, 8, 12 and 13. The driver again releases the brake pedal 3. The conduits 4 and 9 are released from pressure. The ball valve member 37 seats on the valve seat 45. The small openings 175 are positioned at the left side of the inner lip portion 171 of the seal member 168. The higher brake fluid pressures are thus kept in the wheel cylinders 7a, 8a, 12a and 13a of the wheels 7 8, 12 and 13. The automobile is stopped on the steepy inclined roadway.

The actuation to start the automobile is the same as in the first embodiment. The ball valve member 37 is separated from the valve seat 45 by the plunger 52. The brake fluid is returned from the wheel cylinders 7a and 8a of the wheels 7 and 8 to the master cylinder 2 through the interior of the ball guide 38 in which the fluid pressure decreases. The valve control piston 163 is moved rightwards due to the pressure difference between the third fluid pressure chamber 180 and the second fluid pressure chamber 174. The small openings 175 are positioned at the right side of the inner lip portion 171 of the seal member 168. The brake fluid is returned from the wheel cylinders 12a and 13a of the wheels 12 and 13 into the master cylinder 2 through the second fluid pressure chamber 174, the small openings 175 and the first fluid pressure chamber 173.

According to this embodiment, after the fluid pressure is kept in the wheel cylinders 7a, 8a 12a and 13a, higher fluid pressures can be applied and kept both in the first fluid pressure system for the wheel cylinders 7a and 8a, and in the second fluid pressure system for the wheel cylinders 12a and 13a, again by treading the brake pedal 3. Accordingly, reliability of braking operation is higher.

Further according to this embodiment, air purging or bleeding operation which is required in the manufacturing process of the automobile, can be easily performed for the second fluid pressure system, after it is performed for the first fluid pressure system.

When air is purged from the second fluid pressure system by actuating the master cylinder 2 after air has been purged from the first fluid pressure system, the fluid pressure of the interior of the ball guide 38 becomes considerably higher than that of the second fluid pressure chamber 174, since fluid pressures are generated in the two chambers of the tandem master cylinder 2 at the same time. Accordingly, the valve control piston 163 is moved leftwards. The communication through the small openings 175 between the first and second fluid pressure chambers 173 and 174 is cut off. However, brake fluid can flow from the master cylinder side towards the wheel cylinder side through the gap between the deformed inner lip portion 171 of the seal member 168 and the left end portion of the valve control piston 163, and it cannot flow from the wheel cylinder side towards the master cylinder side. The valve constituted by the seal member 168 and the left end portion of the valve control position 163 functions as a check valve. Accordingly, brake fluid (liquid) can be easily flowed into the second fluid pressure chamber 174, so that air can be easily purged from the seocnd fluid pressure chamber 174 to the external through a bleeder screw (not showns) which is, for example, mounted on the wheel cylinder.

Figure 5:
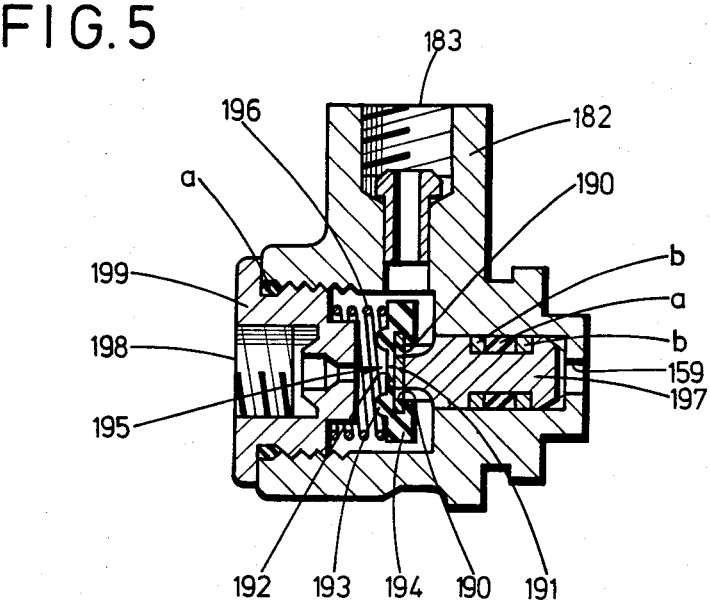
FIG. 5 is a cross-sectional view of an important part of a brake control apparatus according to a third embodiment of this invention.

FIG. 5 is a cross-sectional view of a second brake control valve of a brake control apparatus according to a third embodiment of this invention.

This embodiment is different from the above embodiments in construction of a second brake control valve. The other parts are the same as in the first or second embodiment.

A main body 182 is fixed to the not-shown main body of the first brake control valve. An inlet 183 is made in the main body 182, communicating with a stepped cylindrical bore of the latter. A valve control piston 197 is slidably fitted into the smaller section of the stepped cylindrical bore. A disc 191 in which small openings 190 are made in circle, contacts with the top end of the valve control piston 197. A valve member 194 of rubber is so fixed to the disc 191 as to cover the small openings 190 of the latter. A spring 196 whose spring force is relatively small, is arranged between the valve member 194 and a cover 199 screwed to the left opening of the stepped cylindrical bore. The valve control piston 197 is urged rightward through the valve member 194. An annular projection 193 is formed around a central opening 192 in the valve member 194. An outlet 198 is made in the cover 199, and it communicates through a reduced hole with the stepped cylindrical bore. An inner end surface of the cover 199 functions as a valve seat for the valve member 194. A valve 195 is constituted by the disc 191, the valve member 194, the spring 196 and the inner end surface of the cover 199. The inlet 183 is connected to the master cylinder conduit, while the outlet 198 is connected to the wheel cylinder side conduit.

When the driver treads the break pedal 3 (not shown in FIG. 5), the brake fluid is supplied through the inlet 183, the larger section of the stepped cylindrical bore, and the outlet 198 to the wheel cylinders. When the clutch pedal 77 (not shown in FIG. 5) is trodden, and the brake pedal 3 is released, the fluid pressure of the interior of the ball guide 38 communicating with the hole 159 is locked, and the fluid pressure of the larger section of the stepped cylindrical bore gradually decreases in the main body 182. The valve control piston 197 is moved leftwards to contact the valve member 194 with the valve seat of the cover 199. Now, brake fluid can flow thorough the small openings 190 and the central opening 192 of the deformed valve member 194 from the inlet 183 towards the outlet 198. However, brake fluid is inhibited from flowing towards the inlet 183 from the outlet 198. Accordingly, a fluid pressure is kept in the wheel cylinders 12a and 13a.

Figure 6:
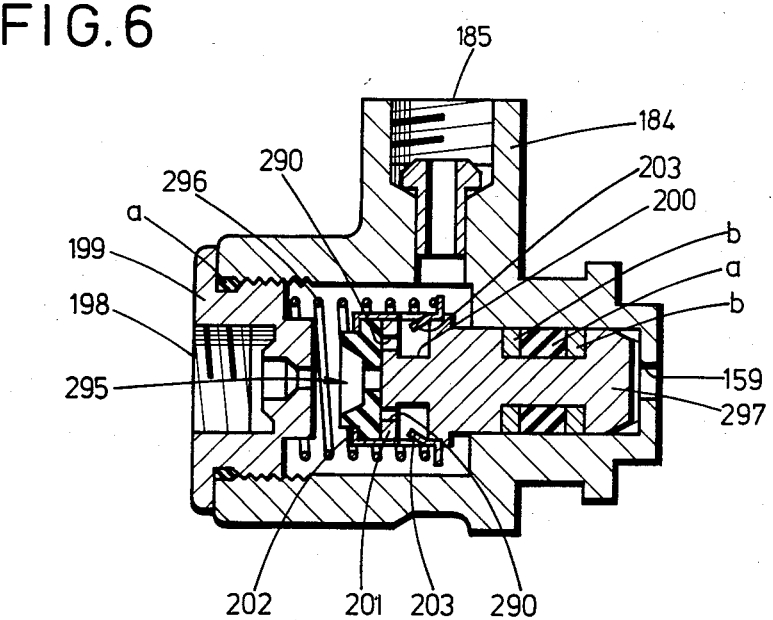
FIG. 6 is a cross-sectional view of an important part of a brake control apparatus according to a fourth embodiment of this invention.

FIG. 6 is a cross-sectional view of a second brake control valve of a brake control apparatus according to a fourth embodiement of this invention.

This embodiment is different from the above embodiments in construction of a seocnd brake control valve. The other parts are the same as in the first or second embodiment.

A main body 184 is fixed to the not-shown main body of the first break control valve. An inlet 185 is made in the main body 184, communicating with a stepped cylindrical bore of the letter. A valve control piston 297 is slidably fitted into the smaller section of the stepped cylindrical bore. A disc portion 201 in which small openings 290 are made in circle, is integrally formed with the top end portion of the valve control piston 297. A valve member 202 of rubber having a central opening is attached to the disc portion 201 of the valve control piston 297 by a spring receiver 203. Nails 203' of the spring receiver 203 are engaged with an annular groove 200 of the valve control piston 297. A spring 296 whose spring force is relatively small, is arranged between the cover 199 and the spring receiver 203 to urge the valve control piston 297 rightwards. An annular projection is formed around the central opening in the valve member 202. The outlet 298 is made in the cover 299, and it communicates through the reduced hole with the stepped cylindrical bore. An inner end surface of the cover 299 functions as a valve seat for the valve member 202. A valve 295 is constituted by the disc portion 201, the valve member 202, the spring 296 and the inner end surface of the cover 199. The inlet 185 is connected to the master cylinder side conduit, while the outlet 198 is connected to the wheel cylinder side conduit. Operations of the above described second brake control valve are the same as those of the valve of FIG. 5.

The valves 195 and 295 of FIG. 5 and FIG. 6 are check valves to block the brake fluid flow toward the inlets 183 and 185 from the outlets 198. Air purging operation is easy as in the embodiment of FIG. 3 or FIG. 4.

As above described, only the ball 37 and the plunger 52 in the first brake control valve 6 or 107 are driven through the cam shaft 17 by the clutch operation. The second brake control valve 11 or 113 is automatically opened and closed by the change of the brake fluid pressure. Accordingly, the clutch pedal 77 is light. The automobile can be smoothly started.

While the preferred embodiments have been described, variations thereto will occur to those skilled in the art within the scope of the present inventive concepts which are delineated by the following claims.

For example, in the above-described embodiments, the cam shaft 17 is rotated round its axis through the wire 29 connected to the clutch pedal 77. However, the cam shaft 17 may be so designed as to be slided in its axial direction in operation. In that case, a suitable cam portion is formed on the cam shaft instead of the cam portion 9, and parts to be associated with the cam shaft are so designed as to slide the cam shaft in its axial direction with actuation of the clutch pedal 77.

In the above-described embodiments, the cam shaft is driven through the wire 29 by treading the clutch pedal 77. However, it may be driven by a clutch fluid pressure from a clutch master cylinder.

Further, in the above-described embodiments, the ball valve member 37 is controlled by the plunger 52 following the cam surface of the cam portion 18. However, without using the plunger 52, a first brake control valve of a brake control apparatus according to this invention may be so designed that the ball valve member 37 contacts directly with the cam surface of the cam prortion 18.

Further, in the above-described embodiments, the valve member 37 is a ball. However, it is not limited to a ball. Any valve member which can move, slide or roll on the cylindrical bore when the automobile is facing upwardly on an inclined roadway, may be used in the first brake control valve according to this invention. For example, a valve member in the shape of parallelepiped may be used, if it can slide when the automobile is facing upwardly on an inclined roadway.

Further in the above-described embodiments, the ball valve member 37 may be received directly by the larger cylindrical bore section of the stepped cylindrical bore 15, instead of that it is received by the cup-shaped ball guide 38 which is, in turn, received by the larger cylindrical bore section.

Further, in the embodiment of FIG. 5 or FIG. 6, the spring 196 or 296 is arranged between the cover 199 and the valve member 194 or the left end portion of the valve control piston 297. Instead of that, a spring may be arranged between the right end portion of the valve control piston 197 or 297 and the bottom wall of the main body 182 or 184 so that the valve member 194 or 202 normally contacts with the inner surface of the cover 299. In that case, a wheel cylinder of the drum brake type is connected to the outlet 198. Some fluid pressure remains in the wheel cylinder without having retarding effect on the wheel. With such an arrangement, the decrease of the break fluid pressure in the wheel cylinder of the second brake fluid system is prevented in the brake fluid pressure holding operation.

Further, in the above embodiment, the conduits 4, 5, 9 and 10 are connected in the manner of the X-connecting type for the wheel cylinders 7a, 8a, 12a and 13a. However, they may be connected in the other manner.

What is claimed is:

1. A brake control apparatus for an automobile having a brake fluid pressure generating source actuatable by a driver, at least two wheels with wheel cylinder, and at least two brake fluid pressure systems, one of said systems being connected between said brake fluid generating source and one of said wheel cylinders of the wheels, and another of said systems being connected between said brake fluid generating source and another of said wheel cylinders of the wheels; said brake control apparatus, in one of said brake fluid pressure systems, comprising:

(A) a first ma:n body having a first bore, a first chamber, a first inlet communicating with said first bore, and a first outlet communicating with said first chamber, said first inlet being connected to said brake fluid pressure generating source, said first outlet being connected to one of said wheel cylinders, and said first bore, first chamber, first inlet and first outlet defining a brake fluid passage between said brake fluid pressure generating source and said one of the wheel cylinders;

(B) a movable valve member arranged in said first chamber, and moved by its weight when the automobile is facing upwardly on an inclined roadway;

(C) valve means arranged in said first bore, and engageable with said movable valve member to check brake fluid flow between said brake fluid pressure generating source and said one of the wheel cylinders; and (D) displacing means for displacing said movable valve member in response to stop operation of said automobile for opening and closing said valve means when said automobile is facing upwardly on said inclined roadway;

and said brake control apparatus, in another of said brake fluid pressure system, comprising:

(E) A second main body having a second bore, a second inlet connected to said brake fluid generating source, and a second outlet connected to another of said wheel cylinders;
(F) a valve control piston slidably fitted to said second bore to form second and third chambers at both ends in said second main body, said second chamber communicating with said first chamber of said first main body, and said third chamber communicating with said second outlet;
(G) second valve means arranged in a brake fluid passage between said second inlet and outlet, and engageable with said valve control piston to block brake fluid flow towards said second inlet from said second outlet, said valve control piston being moved to said second valve means, when an urging force to said valve control piston from said second chamber becomes higher than another urging force to said valve control piston from said third chamber and to be engaged with said second valve means.

2. A brake control apparatus for an automobile according to claim 1, in which said second valve means is check valve means which permits brake fluid to flow towards said second outlet from said second inlet, while blocking brake fluid flow towards said second inlet from said second outlet.

3. A brake control apparatus for an automobile according to claim 1, in which said first and second main bodies are formed integrally with each other.

4. A brake control apparatus for an automobile according to claim 1, in which said stop operation of the automobile includes a clutch disconnecting operation.

5. A brake control apparatus for an automobile according to claim 4, in which said displacing means includes a cam shaft interconnected to a clutch pedal, said cam shaft having a cam portion positioned in said brake fluid passage of the first main body, and being movable upon actuation of said clutch pedal to displace said movable valve member in response to driving action of said cam portion for opening and closing said valve means when said automobile is facing upwardly on said inclined roadway.

6. A brake control apparatus for an automobile according to claim 1, in which said second valve means includes a valve member fixed to a top of said valve control piston, facing to said third chamber and said second outlet, and a spring for urging said valve control piston in a direction towards said second chamber from said third chamber.

7. A brake control apparatus for an automobile according to claim 2, in which said second valve means includes a lip-type seal member by which one end portion of said valve control piston is sealed against the inner wall of said second bore, and a spring for urging said valve control piston in a direction towards said second chamber from said third chamber, said one end portion of the valve control piston facing to said third chamber.

8. A brake control apparatus for an automobile according to claim 6, in which a reduced path is formed in said second outlet.

9. A brake control apparatus for an automobile according to claim 7, in which a reduced path is formed in said brake fluid passage between the second inlet and outlet.

10. A brake control apparatus for an automobile according to claim 7, in which a reduced path is formed in said second outlet.

11. A brake control apparatus for an automobile according to claim 9 in which said reduced path is a small opening made in said one end portion of the valve control piston, and a fourth chamber, is further formed around a middle portion of said valve control position in said second bore of the second main body, communicating with said second inlet, said opening being made to communicate with said third chamber and said fourth chamber in the normal condition, and being intercepted from said fourth chamber in the brake fluid holding condition by said lip-type seal member.

12. A brake control apparatus for an automobile according to claim 2, in which said second valve means includes a seal member attached to the third chamber side end of said valve control piston, and a spring for urging said valve control position in a direction towards said second chamber from said third chamber, said second outlet being closed, when said valve control position is moved against said spring, by said seal member to inhibit brake fluid from flowing towards said second inlet from said second outlet, and to permit brake fluid from flowing towards said second outlet from said second inlet.

13. A brake control apparatus for an automobile according claim 12, in which a reduced path is formed in said second outlet.

14. A brake control apparatus for an auto-mobile according to claim 12, in which a disc plate having openings is interposed between said seal member and said end portion of the valve control position, said openings being covered by said seal member and said brake fluid being permitted to flow through said openings of the disc plate and said central opening of the seal member from said second inlet to said second outlet.

15. A brake control apparatus for an automobile according to claim 14, in which said disc plate is formed integrally with said valve control piston.

16. A brake control apparatus for an automobile according to claim 15, in which said seal member is attached to said valve control piston by a spring receiver to receive said spring.

17. A brake control apparatus for an automobile according to claim 2, in which said second valve means includes a seal member attached to the third chamber side end of said valve control position, and a spring for urging said valve control position in a direction towards said third chamber from said second chamber, said second outlet being closed in the initial condition by said seal member.

18. A brake control apparatus for an automobile according to claim 1, in which areas of both ends of said valve control piston receiving brake fluid pressure from said second and third chambers are substantially equal to each other.

19. A brake control apparatus for an automobile according to claim 5, in which a third bore is further made in said first main body, said third and first bores intersecting with each other, and said cam shaft movably fitted into said third bore.

20. A brake control apparatus according to claim 9 in which said third bore has an open end side and a closed end side, and said apparatus further includes a cover member for closing the open end side of said third bore, and a low-friction ring interposed between said cover member and the end of said cam shaft at the open end side of said third bore.

21. A brake control apparatus according to claim 5, in which said apparatus further includes a plunger slidably fitted within said first bore, said plunger being interposed between said cam portion of the cam shaft and said movable valve member, one end of said plunger contacting the cam surface of said cam portion to follow the latter, and the other end of said plunger facing said movable valve member.

22. A brake control apparatus according to claim 5, in which said apparatus further includes a flexible drive member connecting said cam shaft to said clutch pedal.

23. A brake control apparatus according to claim 5 in which said cam shaft is rotated around its axis in response to movement of the clutch pedal.

24. A brake control apparatus according to claim 1 in which said movable valve member is a ball.

25. A brake control apparatus according to claim 5 in which said cam portion comprises a reduced-diameter, eccentric section of said cam shaft.

26. A brake control apparatus according to claim 24, in which said ball is contained in a cup-shaped ball guide which is fitted into said first chamber.

27. A brake control apparatus according to claim 26, in which axial grooves are formed in the inner surface of said ball guide.

* * * * *